(12) United States Patent
Tamura et al.

(10) Patent No.: US 9,807,261 B2
(45) Date of Patent: Oct. 31, 2017

(54) IMAGE FORMING APPARATUS WITH CONTACTLESS CARD READER

(71) Applicant: KYOCERA Document Solutions Inc., Osaka (JP)

(72) Inventors: Takashi Tamura, Osaka (JP); Hirofumi Kuroki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 130 days.

(21) Appl. No.: 14/781,783

(22) PCT Filed: Mar. 19, 2014

(86) PCT No.: PCT/JP2014/057568
§ 371 (c)(1),
(2) Date: Oct. 1, 2015

(87) PCT Pub. No.: WO2014/162877
PCT Pub. Date: Oct. 9, 2014

(65) Prior Publication Data
US 2016/0057296 A1    Feb. 25, 2016

(30) Foreign Application Priority Data
Apr. 3, 2013   (JP) ................................. 2013-077822

(51) Int. Cl.
*H04N 1/00* (2006.01)
*G03G 15/00* (2006.01)

(52) U.S. Cl.
CPC ..... *H04N 1/00342* (2013.01); *G03G 15/5091* (2013.01); *G03G 15/605* (2013.01);
(Continued)

(58) Field of Classification Search
CPC ........... H04N 1/00342; H04N 1/00559; G03G 15/5091
See application file for complete search history.

(56) References Cited

U.S. PATENT DOCUMENTS 5,884,132 A * 3/1999 Gotham ............. G03G 15/6502
271/145
6,712,446 B1   3/2004 Huffman
(Continued)

FOREIGN PATENT DOCUMENTS

JP   H11-203422 A   7/1999
JP   2001-195549 A   7/2001
(Continued)

OTHER PUBLICATIONS

International Search Report issued in Application No. PCT/JP2014/057568, dated Apr. 22, 2014.
(Continued)

*Primary Examiner* — David M Gray
*Assistant Examiner* — Andrew V Do
(74) *Attorney, Agent, or Firm* — Studebaker & Brackett PC

(57) ABSTRACT

An image forming apparatus (1) includes a scanner unit (12U), a scanner housing (12), and a contactless card reader (42). The scanner unit (12U) optically reads an image of an original document to generate image data. The scanner housing (12) accommodates the scanner unit (12U). The card reader (42) has a flat information reading surface (421) and reads information recorded on an information card C. The scanner housing (12) has a confronting surface (12F) that a user confronts. The card reader (42) is mounted inside the scanner housing (12) such that the information reading surface (421) takes an upstanding posture, and is disposed behind the confronting surface (12F) of the scanner housing (12). The confronting surface (12F) of the scanner housing (12) includes a surface (41) that covers the information reading surface (421) and over which a card is held.

12 Claims, 10 Drawing Sheets

(52) U.S. Cl.
CPC ..... *H04N 1/00559* (2013.01); *H04N 1/00572* (2013.01); *H04N 2201/006* (2013.01); *H04N 2201/0094* (2013.01)

(56) References Cited

U.S. PATENT DOCUMENTS

| | | |
|---|---|---|
| 6,873,806 B2 | 3/2005 | Kobayashi et al. |
| 7,188,923 B2 | 3/2007 | Huffman |
| 8,820,731 B2 | 9/2014 | Kawano et al. |
| 2004/0081479 A1 | 4/2004 | Kobayashi et al. |
| 2004/0125161 A1 | 7/2004 | Huffman |
| 2010/0118351 A1 | 5/2010 | Nakazawa |
| 2012/0043715 A1 | 2/2012 | Kawano et al. |
| 2013/0320082 A1* | 12/2013 | Mun .................. G06K 7/01 235/380 |
| 2014/0239064 A1* | 8/2014 | Onishi .............. G03G 15/5066 235/380 |
| 2014/0333020 A1 | 11/2014 | Kawano et al. |

FOREIGN PATENT DOCUMENTS

| | | |
|---|---|---|
| JP | 2003-337505 A | 11/2003 |
| JP | 2006-079384 A | 3/2006 |
| JP | 2010-114715 A | 5/2010 |
| JP | 2010-141480 A | 6/2010 |
| JP | 2010-250038 A | 11/2010 |
| JP | 2011-203371 A | 10/2011 |
| JP | 2012-042888 A | 3/2012 |
| JP | 2012-210801 A | 11/2012 |

OTHER PUBLICATIONS

An Office Action; "Notice of Reasons for Rejection," issued by the Japanese Patent Office dated Aug. 16, 2016, which corresponds to Japanese Patent Application No. 2015-509991 and is related to U.S. Appl. No. 14/781,783.

* cited by examiner

IMAGE FORMING APPARATUS WITH CONTACTLESS CARD READER

TECHNICAL FIELD

The present invention relates to an image forming apparatus and a scanner that include a contactless card reader.

BACKGROUND ART

Image forming apparatuses (e.g., copiers or printers) have a function of performing user authentication, for example. When a user uses an image forming apparatus, the image forming apparatus performs user authentication using a card reader and an integrated circuit (IC) card. Specifically, the card reader is mounted on the image forming apparatus, and the user holds the IC card over a reading surface of the card reader. It is preferable that the card reader does not hinder visibility of a sheet discharged onto an internal discharge section and operation of taking out a sheet from the internal discharge section. In view of the foregoing, the card reader is generally mounted on a side surface of a scanner housing of the image forming apparatus such as to be level with an operation section (see Patent Literature 1, for example).

CITATION LIST

Patent Literature

Patent Literature 1

Japanese Patent Application Laid-Open Publication No. 2011-203371

SUMMARY OF INVENTION

Technical Problem

However, in a configuration in which the card reader protrudes from the side surface of the image forming apparatus, the card reader may for example be damaged by impacting against a wall or other article in transportation of the image forming apparatus. In a case where the image forming apparatus is packed, the protruding card reader may increase a package volume, resulting in an increase in transportation cost. In a configuration in which the card reader is removed from the image forming apparatus in transportation and packing, damage can be prevented and transportation cost can be reduced. However, workload of attaching, detaching, and packing the card reader increases.

The present invention has an objective of providing an image forming apparatus and a scanner for which the workload of packing and transportation can be reduced while also limiting cost and preventing damage.

Solution to Problem

An image forming apparatus according to an aspect of the present invention includes a scanner unit, an image forming unit, a body housing, a scanner housing, and a contactless card reader. The scanner unit is configured to optically read an image of an original document to generate image data. The image forming unit is configured to form an image on a sheet based on the image data. The body housing accommodates the image forming unit. The scanner housing is disposed above the body housing and accommodates the scanner unit. The card reader has a flat information reading surface and is configured to read information recorded on an information card. The scanner housing has a confronting surface that a user confronts. The card reader is mounted inside the scanner housing such that the information reading surface takes an upstanding posture, and is disposed behind the confronting surface of the scanner housing. The confronting surface of the scanner housing includes a surface that covers the information reading surface and over which a card is held.

A scanner according to another aspect of the present invention includes a scanner unit, a scanner housing, and a contactless card reader. The scanner unit is configured to optically read an image of an original document to generate image data. The scanner housing accommodates the scanner unit. The card reader has a flat information reading surface and is configured to read information recorded on an information card. The scanner housing has a confronting surface that a user confronts. The card reader is mounted inside the scanner housing such that the information reading surface takes an upstanding posture, and is disposed behind the confronting surface of the scanner housing. The confronting surface of the scanner housing includes a surface that covers the information reading surface and over which a card is held.

Advantageous Effects of Invention

According to the present invention, the card reader protrude neither from the body housing nor the scanner housing of the image forming apparatus. In the above configuration, the workload of packing and transporting the image forming apparatus can be reduced while limiting cost and preventing damage.

DESCRIPTION OF EMBODIMENTS

Figure 1:
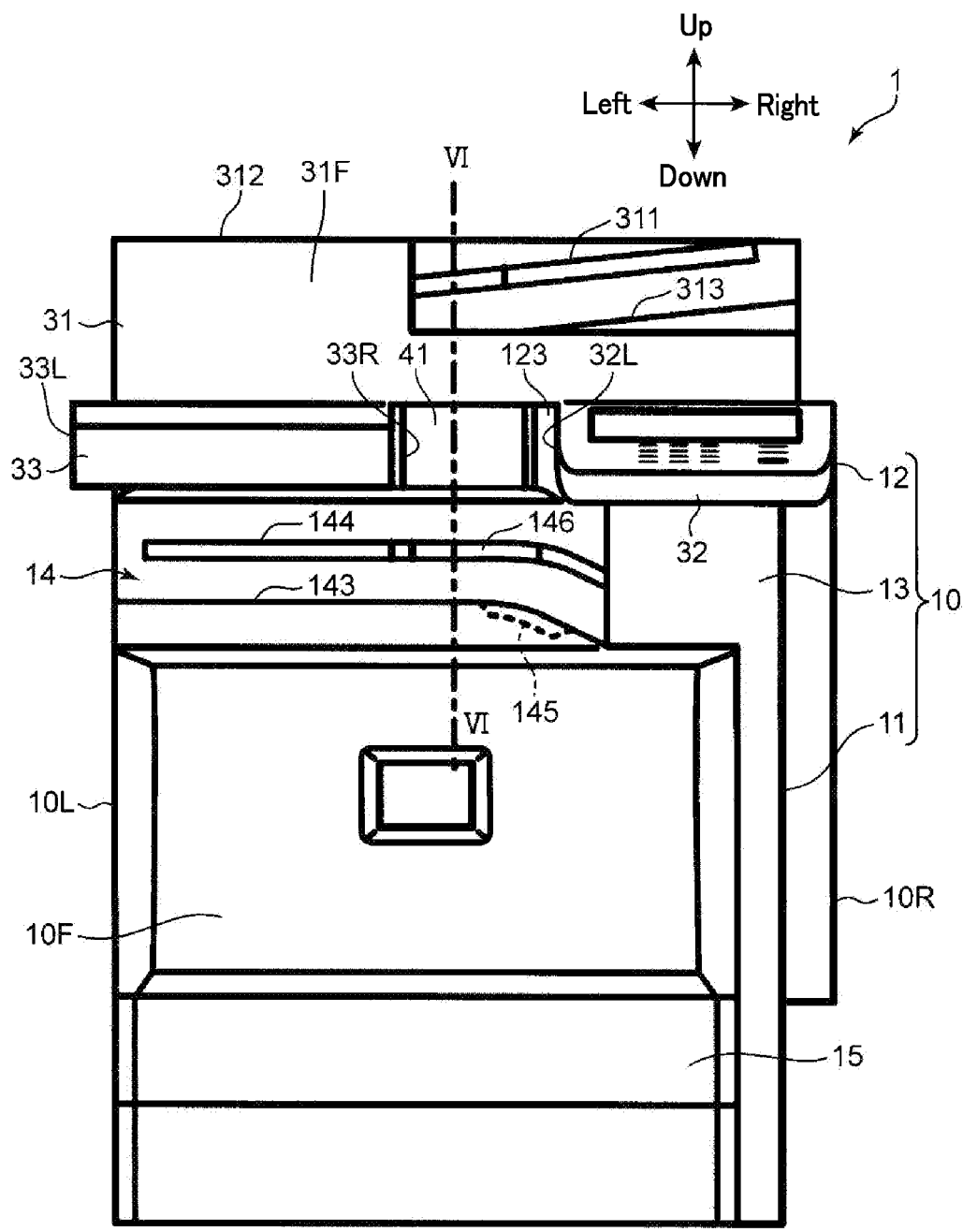
FIG. 1 is a front view of an image forming apparatus according to an embodiment of the present invention.
Figure 2:
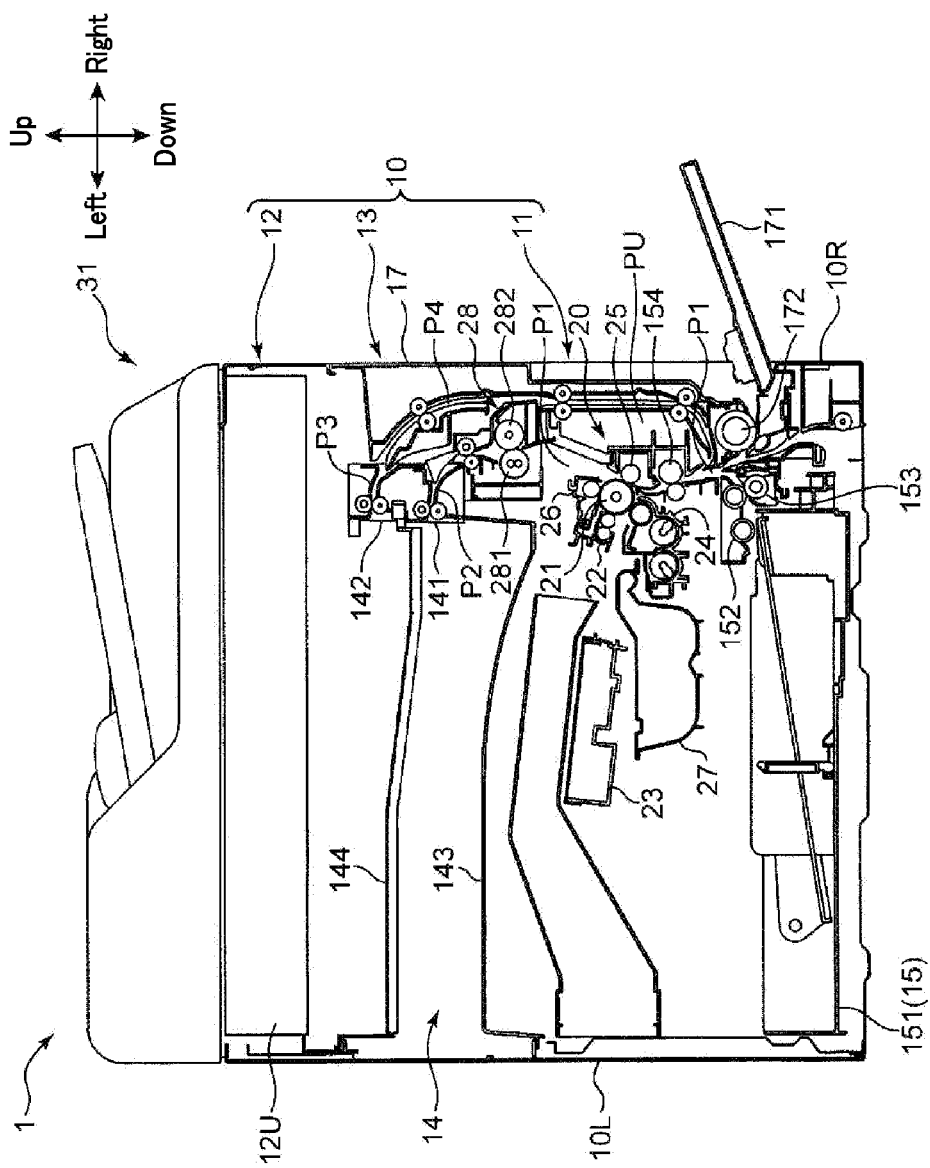
FIG. 2 is a cross sectional view illustrating an internal configuration of the image forming apparatus according to the embodiment of the present invention.

Embodiments of the present invention will be described below with reference to the accompanying drawings. Like reference signs denote like elements or corresponding elements in the drawings; description of such elements is not repeated. FIG. 1 is a front view of an image forming apparatus 1 according to an embodiment of the present invention. FIG. 2 is a cross sectional view illustrating an internal configuration of the image forming apparatus 1. The image forming apparatus 1 is a printer having a copy function for monochrome printing. However, the image forming apparatus according to the present invention may be a color printer, a facsimile machine, a multifunction peripheral having printing and facsimile functions, or any other apparatus for forming an image on a sheet.

The image forming apparatus 1 includes a main body 10 and an auto document feeder (ADF) 31. The main body 10 includes a substantially rectangular parallelepiped housing. That is, the main body 10 includes a box that accommodates various devices for performing image formation on a sheet. The auto document feeder 31 is disposed on the top of the main body 10. The sheet may be plain paper, recycled paper, thin paper, cardboard, coated paper, or an overhead projector sheet, for example.

The auto document feeder 31 automatically conveys an original document as a copy target via a document reading point. The document reading point is a point that is set on the top surface of the main body 10 and at which a scanner unit 12U, which will be described later, reads the original document. The auto document feeder 31 includes a document feed tray 311 on which the original document is placed, a document conveyance section 312, and a document exit tray 313 onto which the original document is discharged after being read. The document conveyance section 312 automatically conveys the original document via the document reading point on a sheet-by-sheet basis.

The main body 10 includes a substantially rectangular parallelepiped body housing 11, a substantially rectangular parallelepiped scanner housing 12, and a joint housing 13 (a pillar). The scanner housing 12 is disposed above the body housing 11. The joint housing 13 connects the body housing 11 to the scanner housing 12. The main body 10 has a front surface 10F, a right side surface 10R, and a left side surface 10L. The scanner housing 12 has a front surface 12F (see FIG. 3).

In the present embodiment, among outer surfaces of the main body 10, a surface that a user operating the image forming apparatus 1 confronts is defined as the front surface 10F (a confronting surface) of the main body 10. Further, among outer surfaces of the scanner housing 12, a surface that the user operating the image forming apparatus 1 confronts is defined as the front surface 12F (a confronting surface) of the scanner housing 12.

The body housing 11 accommodates an image forming unit 20. The image forming unit 20 forms an image (specifically, a toner image) on a sheet. The joint housing 13 accommodates a fixing unit 28. The scanner housing 12 accommodates the scanner unit 12U. The scanner unit 12U optically reads an image of the original document to generate image data. The scanner housing 12 and the scanner unit 12U constitute a scanner in combination. The image forming unit 20 forms an image on the sheet based on the image data generated by the scanner unit 12U.

The image forming apparatus 1 further includes an internal discharge section 14 (an internal discharge section). The internal discharge section 14 is disposed between the body housing 11 and the scanner housing 12. The sheet on which the image is formed by the image forming unit 20 is discharged into the internal discharge section 14. The internal discharge section 14 includes an internal space surrounded by the top surface of the body housing 11, the lower surface of the scanner housing 12, and a left surface of the joint housing 13.

The joint housing 13 is disposed between the body housing 11 and the scanner housing 12. The joint housing 13 has a first sheet exit port 141 (a sheet exit port) and a second sheet exit port 142 (a sheet exit port). The first and second sheet exit ports 141 and 142 are each located at a side of the internal discharge section 14. The sheet is discharged into the internal discharge section 14 through the first or second sheet exit port 141 or 142.

Specifically, the first sheet exit port 141 is located at a side of the internal discharge section 14 corresponding to the right side surface 10R of the main body 10 (at the right side of the internal discharge section 14) and is open toward the internal space for allowing a sheet to be discharged into the internal discharge section 14. The second sheet exit port 142 is located above the first sheet exit port 141 and is open toward the internal space for allowing a sheet to be discharged into the internal discharge section 14.

The bottom of the internal space is defined by an internal discharge tray 143 (a sheet tray or a first sheet tray). The internal discharge tray 143 serves as the top surface of the body housing 11 and is located below the first sheet exit port 141. The internal discharge tray 143 receives a sheet discharged through the first sheet exit port 141. A sub-exit tray 144 (a second sheet tray) is disposed (attached) between the first and second sheet exit ports 141 and 142 above the internal discharge tray 143. The sub-exit tray 144 receives a sheet discharged through the second sheet exit port 142. A sheet undergoing duplex printing is temporarily discharged onto the sub-exit tray 144 for switchback conveyance.

A paper feed cassette 15 is attached to a lower part of the main body 10 in a detachable manner. The paper feed cassette 15 accommodates sheets on which image formation is performed. A side unit 17 capable of being drawn rightward is disposed at the right side surface 10R of the main body 10. A conveyance unit PU is mounted in the side unit 17.

The image forming unit 20 includes a photosensitive drum 21, a charger 22, an exposure device 23, a developing device 24, a transfer roller 25, and a cleaner 26. The charger 22, the exposure device 23, the developing device 24, the transfer roller 25, and the cleaner 26 are disposed around the photosensitive drum 21. The photosensitive drum 21 rotates about an axis of the photosensitive drum 21. The photosensitive drum 21 has a circumferential surface on which an electrostatic latent image and a toner image are formed. The charger 22 uniformly charges the circumferential surface of the photosensitive drum 21.

The exposure device 23 irradiates the circumferential surface of the photosensitive drum 21 with laser light for formation of an electrostatic latent image. The developing device 24 supplies toner to the circumferential surface of the photosensitive drum 21 for development of the electrostatic latent image formed on the circumferential surface of the photosensitive drum 21. The transfer roller 25 forms a transfer nip part in conjunction with the photosensitive drum 21 and transfers a toner image formed on the circumferential surface of the photosensitive drum 21 to a sheet. The cleaner 26 cleans the circumferential surface of the photosensitive drum 21 after transfer of the toner image. A toner container 27 is disposed adjacently to the developing device 24 and replenishes the developing device 24 with toner.

The fixing unit 28 includes a fixing roller 281 and a pressure roller 282. A heat source is disposed in the interior of the fixing roller 281. The pressure roller 282 forms a fixing nip part in conjunction with the fixing roller 281. The fixing unit 28 performs fixing at the fixing nip part through application of heat and pressure to a sheet to which a toner image is transferred at the transfer nip part. After the sheet undergoes fixing, the sheet is discharged toward the internal discharge section 14 through the first or second sheet exit port 141 or 142.

The scanner unit 12U includes an image sensor, a light source that irradiates an original document with light, and a carriage (not illustrated). A mirror (not illustrated) that guides light reflected by the original document to the image sensor is mounted in the carriage. Note that the image sensor and/or the light source may be mounted in the carriage. A narrow contact glass for automatic reading and a wide contact glass for receiving manual document placement are fitted in the top of the scanner unit 12U. The auto document feeder 31 automatically conveys an original document to the upper surface of the contact glass for automatic reading. In a situation in which an original document is to be placed on the contact glass for receiving manual document placement, the auto document feeder 31 is opened upward. The image sensor performs photoelectric conversion of received reflected light to generate analog image data. After the analog image data is converted to digital image data (after A/D conversion), converted data is provided to the exposure device 23.

A sheet conveyance path through which a sheet is conveyed lies in the interior of the main body 10. The sheet conveyance path includes a main conveyance path P1. The main conveyance path P1 extends vertically from a vicinity of a lower part to a vicinity of an upper part of the main body 10 via the image forming unit 20 and the fixing unit 28. A first discharge conveyance path P2 branches from the main conveyance path P1 in the vicinity of a downstream end of the main conveyance path P1. The first discharge conveyance path P2 guides a sheet to the first sheet exit port 141. By contrast, a second discharge conveyance path P3 is connected to a most downstream end (an upper end) of the main conveyance path P1. The second discharge conveyance path P3 guides a sheet to the second sheet exit port 142. In addition, a reversed paper conveyance path P4 extends from the most downstream end to a vicinity of an upstream end of the main conveyance path P1. The reversed paper conveyance path P4 reverses and conveys a sheet in duplex printing.

The paper feed cassette 15 includes a sheet accommodation section 151 that accommodates a stack of sheets. A pickup roller 152 and a paper feed roller pair 153 are disposed near the upper right side of the sheet accommodation section 151. The pickup roller 152 feeds an uppermost sheet of the stack of sheets on a sheet-by-sheet basis. The paper feed roller pair 153 feeds the sheet fed by the pickup roller 152 to the upstream end of the main conveyance path P1.

A manual feed tray 171 for manual paper feed is disposed on the right side surface 10R of the main body 10. A sheet placed on the manual feed tray 171 is fed to the upstream end of the main conveyance path P1 by the manual paper feed roller 172. A registration roller pair 154 is disposed upstream of the image forming unit 20 in the main conveyance path P1. The registration roller pair 154 feeds a sheet to the transfer nip part with a predetermined timing.

The manual feed tray 171 and the manual paper feed roller 172 are also mounted in the side unit 17. The transfer roller 25, one roller of the registration roller pair 154, one roller of the sheet conveyance roller pair, etc. are mounted on an inner side surface of the conveyance unit PU. The inner side surface of the conveyance unit PU serves as one wall surface that defines the main conveyance path P1. An outer side surface of the conveyance unit PU serves as another wall surface that defines the reversed paper conveyance path P4.

In simplex printing on a sheet (image formation on one side of the sheet), the sheet is fed from the sheet accommodation section 151 or the manual feed tray 171 to the main conveyance path P1. The image forming unit 20 transfers a toner image to the sheet. The fixing unit 28 fixes to the sheet the toner transferred to the sheet. The sheet is then discharged onto the internal discharge tray 143 through the first sheet exit port 141 via the first discharge conveyance path P2.

By contrast, in duplex printing on a sheet (image formation on both sides of the sheet), after one side of the sheet undergoes transfer and fixing, the sheet is conveyed via the second discharge conveyance path P3. Then, the sheet is partially discharged onto the sub-exit tray 144 through the second sheet exit port 142. The sheet then undergoes switch-back conveyance to be returned to the vicinity of the upstream end of the main conveyance path P1 via the reversed paper conveyance path P4. Thereafter, the other side of the sheet undergoes transfer and fixing, and then, the sheet is conveyed via the first discharge conveyance path P2 and discharged onto the internal discharge tray 143 through the first sheet exit port 141.

Figure 3:
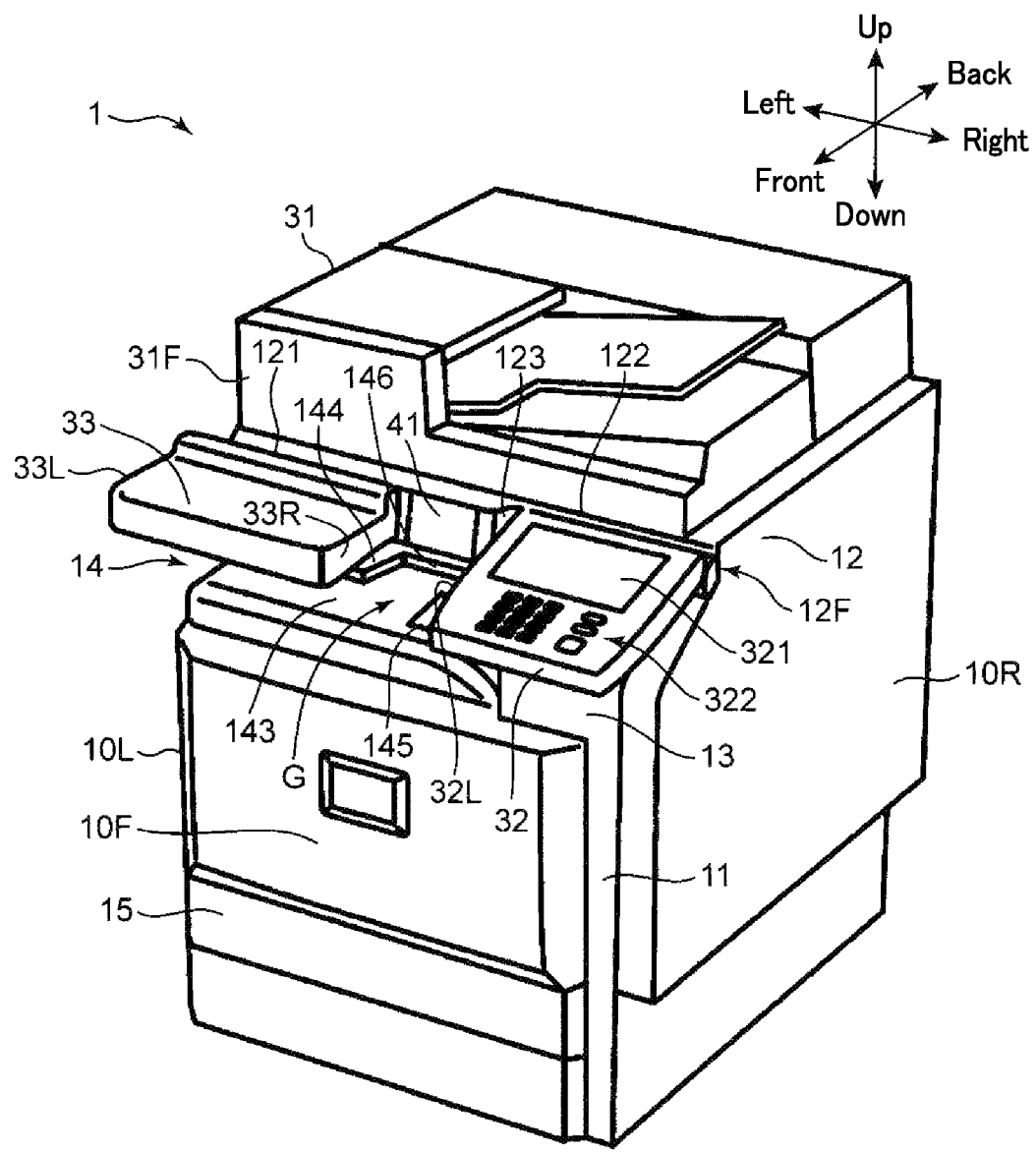
FIG. 3 is a perspective view of the image forming apparatus according to the embodiment of the present invention.
Figure 4:
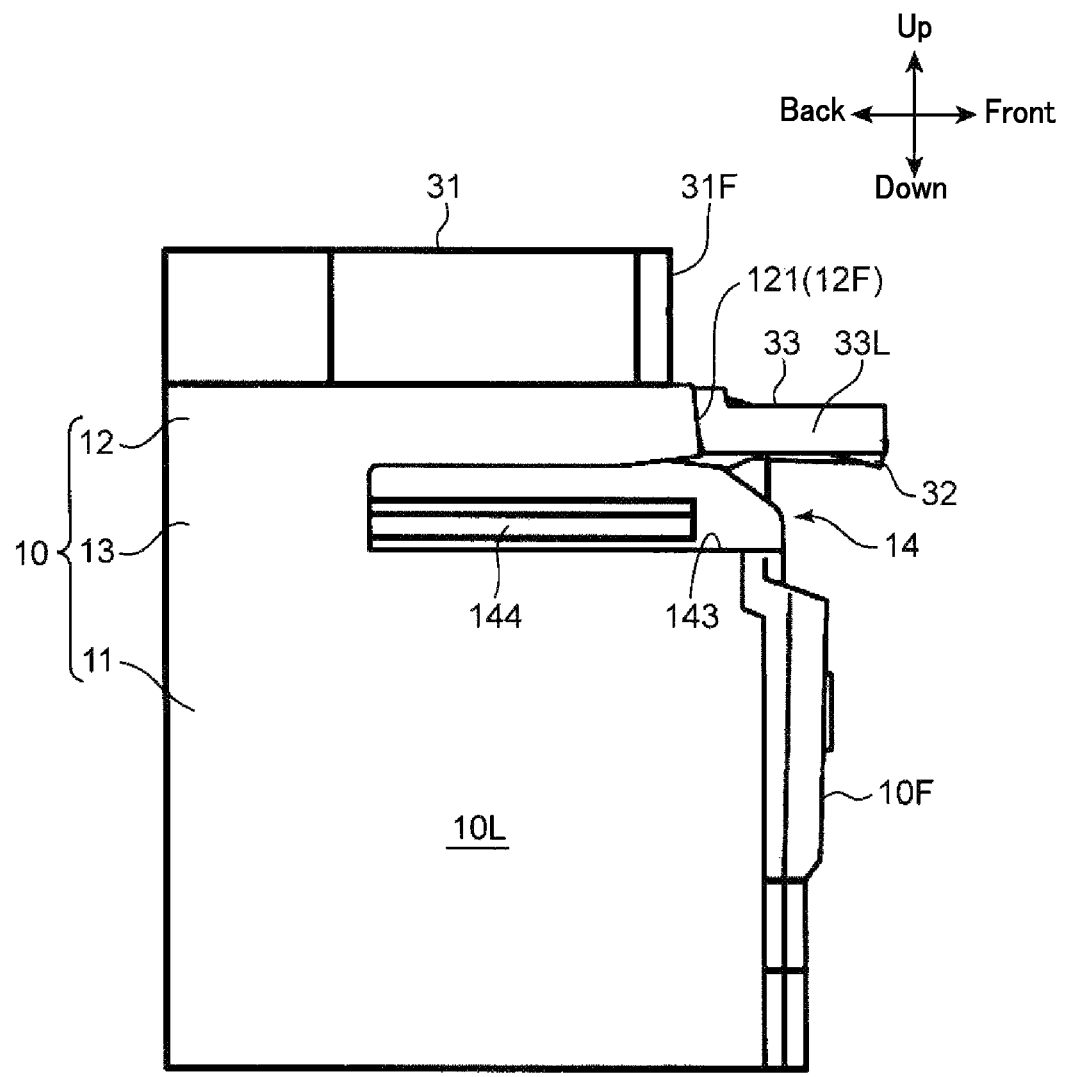
FIG. 4 is a left side view of the image forming apparatus according to the embodiment of the present invention.
Figure 5:
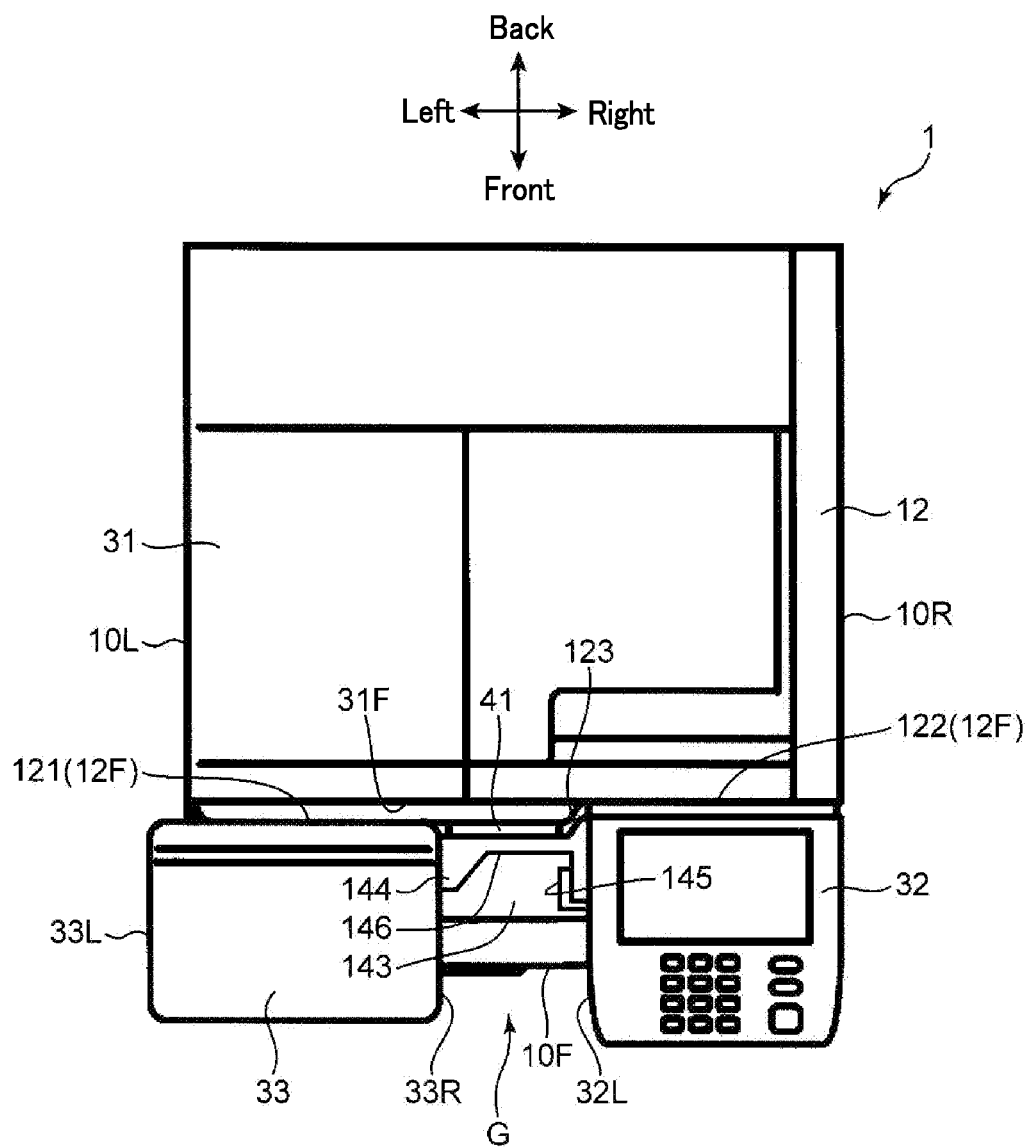
FIG. 5 is a top view of the image forming apparatus according to the embodiment of the present invention.

FIG. 3 is a perspective view of the image forming apparatus 1. FIG. 4 is a left side view of the image forming apparatus 1. FIG. 5 is a top view of the image forming apparatus 1. The image forming apparatus 1 further includes an operation section 32 and a table 33. The operation section 32 protrudes from the front surface 12F of the scanner housing 12. Specifically, the operation section 32 is mounted on a right part of the front surface 12F of the scanner housing 12 such as to protrude frontward from the front surface 12F. The operation section 32 receives user input of operation information. The operation section 32 includes a touch panel 321 and a key group 322. The touch panel 321 displays various types of information and receives user input of operation information. The key group 322 includes various types of keys (various buttons) including a start key and a numeric keypad.

The table 33 protrudes from the front surface 12F of the scanner housing 12. Specifically, the table 33 is mounted on a left part of the front surface 12F of the scanner housing 12 such as to protrude frontward from the front surface 12F. Any device may be placed on the table 33. For example, a keyboard that is optionally attached to the image forming apparatus 1 is placed on the table 33. Provision of the keyboard in addition to the operation section 32 can enable reception of user input of more detailed information to the image forming apparatus 1.

A gap G having a predetermined width is present between a left side surface 32L of the operation section 32 and a right side surface 33R of the table 33. The predetermined width is wide enough for user to insert a hand with clearance. The front surface 12F of the scanner housing 12 is set back from the front surface of the body housing 11 (the front surface 10F of the main body 10). In other words, a front part of the internal discharge tray 143 protrudes frontward from the front surface 12F of the scanner housing 12. In the above configuration, as illustrated in FIG. 5, a front part of the internal discharge tray 143 is visible through the gap G when viewed from above. As a result, a user confronting the front surface 10F can see a sheet discharged on the internal discharge tray 143 through the gap G.

That is, provision of the operation section 32 and the table 33 capable of receiving placement of a keyboard can increase user friendliness of the image forming apparatus 1. In general, an operation section and a table mounted on the front surface of a scanner housing are liable to block a user's line of sight to an internal discharge section. The visibility of a sheet discharged on the internal discharge tray may accordingly be impaired. By contrast, the gap G is present between the operation section 32 and the table 33 in present embodiment, which can secure a viewing path to the internal discharge section 14. Thus, the favorable visibility of a sheet discharged on the internal discharge tray 143 can be ensured.

Referring to FIG. 5, the front surface 12F of the scanner housing 12 includes a left portion 121, a right portion 122, and an intermediate portion 123. The left portion 121 slightly protrudes frontward relative to the right portion 122. The right portion 122 is set in relative to the left portion 121. The intermediate portion 123 is located between the left and right portions 121 and 122 and connects the left and right portions 121 and 122.

The table 33 is mounted on a left region of the left portion 121. The operation section 32 is mounted on the right portion 122. A right region of the left portion 121 is an exposed portion exposed to the front through the gap G. A surface 41 over which a card is held is located in the exposed portion. The surface 41 over which a card is held is disposed between the operation section 32 and the table 33.

The surface 41 over which a card is held is a surface over which a user hold an IC card (information card) for user authentication when the user uses the image forming apparatus 1. The user confronting the front surface 10F of the main body 10 can bring through the gap G a hand holding the IC card close to the surface 41 over which a card is held. The surface 41 over which a card is held includes a translucent resin plate cover and is aligned with the left portion 121 as a single surface.

For example, in order to allow a user to use the image forming apparatus 1 as a printer, user authentication using an IC card is performed before the user provides the image forming apparatus 1 with an instruction to discharge a printed sheet onto the internal discharge tray 143. In this example, the user transmits image data and a print instruction signal to the image forming apparatus 1 from a computer terminal that the user uses at his or her own desk. The user then moves to a location where the image forming apparatus 1 is installed and holds the IC card that the user possesses over the surface 41 over which a card is held. Upon success of user authentication in the image forming apparatus 1, a sheet on which an image based on the transmitted image data is formed is discharged onto the internal discharge tray 143. Then, the user brings back the discharged sheet to his or her own desk.

Figure 6:
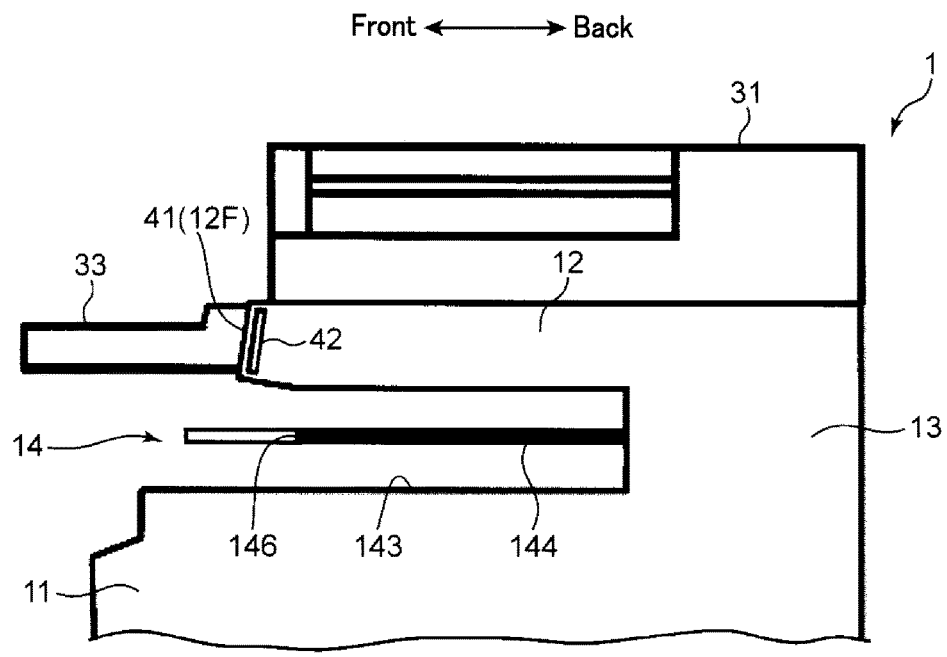
FIG. 6 is a cross sectional view of the image forming apparatus taken along the line VI-VI in FIG. 1.
Figure 7:
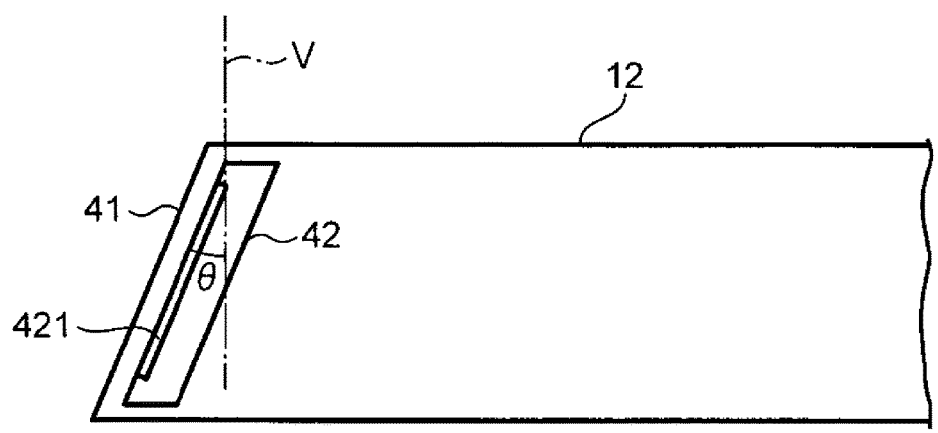
FIG. 7 is an enlarged diagram of a main part of the image forming apparatus illustrated in FIG. 6.

FIG. 6 is a cross sectional view taken along the line VI-VI in FIG. 1. That is, FIG. 6 is a schematic cross sectional view of a part of the image forming apparatus 1 in a back-and-forth direction where the surface 41 over which a card is held is located. FIG. 7 is an enlarged diagram of a main portion of the image forming apparatus 1 in FIG. 6. A card reader 42 is embedded behind the surface 41 over which a card is held. The card reader 42 is a contactless card reader and reads information recorded on an IC card (user authentication information in the present embodiment). Specifically, the card reader 42 has a flat information reading surface 421. The information reading surface 421 includes an antenna for wireless communication with an IC card. The card reader 42 reads the user authentication information recorded on the IC card when the IC card moves to within a predetermined distance (e.g., a predetermined short distance) from the information reading surface 421 (the surface 41 over which a card is held), within which the card is in a wirelessly communicable state with the card reader 42d.

The card reader 42 is mounted inside the scanner housing 12 such as to be close to the front surface 12F and is disposed behind a substantially central region of the front surface 12F of the scanner housing 12 in the right and left directions. In the above configuration, the card reader 42 does not protrude in the right and left directions from the body housing 11 and the scanner housing 12.

Further, the card reader 42 is mounted inside the scanner housing 12 such that the information reading surface 421 takes an upstanding posture and is disposed behind the front surface 12F of the scanner housing 12. The upstanding posture may be a posture with an acute angle relative to a vertical line or a posture in the vertical line, for example. The surface 41 that covers the information reading surface 421 and over which a card is held is disposed at the front surface 12F of the scanner housing 12. The plate cover constituting the surface 41 over which a card is held covers a front part of the information reading surface 421. In the above configuration, the card reader 42 does not protrude in the back-and-forth direction from the body housing 11 and the scanner housing 12.

In the configuration in which the card reader 42 does not protrude in the right and left directions and the back-and-forth direction, the card reader 42 can be prevented from impacting against a wall or other article in transportation and the like of the image forming apparatus 1 to be prevented from being damaged. For the same reason as above, an increase in package volume when the image forming apparatus 1 is packed can be avoided, thereby reducing transportation cost.

Referring to FIG. 7, the card reader 42 is mounted inside the scanner housing 12 such that the information reading surface 421 is inclined by a predetermined angle θ relative to a vertical line V. The predetermined angle θ may be an acute angle, for example. Further, the surface 41 over which a card is held is inclined in correspondence with the inclination of the information reading surface 421 (the card reader 42). In the present embodiment, the surface 41 over which a card is held has the same inclination as the information reading surface 421 (the card reader 42). In the present embodiment, each of the information reading surface 421 and the surface 41 over which a card is held is an inclined surface having an upper end and a lower end located frontward of the upper end (hereinafter referred to as a front downward sloping surface). Note that the predetermined angle is preferably equal to or greater than 5 degrees and not greater than 10 degrees.

There may be a situation in which a general-purpose card reader 42 has a size in a vertical direction greater than a length of the scanner housing 12 in a vertical direction that is necessary for the scanner housing 12. In such a situation, inclination of the information reading surface 421 as in the present embodiment can enable the card reader 42 to be embedded behind the front surface 12F even in a configuration in which the length of the scanner housing 12 in the vertical direction is shorter than the information reading surface 421. Further, in the configuration in which the information reading surface 421 and the surface 41 over which a card is held are each a front downward sloping surface, a user standing and confronting the front surface 12F of the scanner housing 12 can easily view the surface 41 over which a card is held and can easily hold an IC card over the surface 41 over which a card is held.

Furthermore, the surface 41 over which a card is held is disposed in the front surface 12F of the scanner housing 12 in proximity to the gap G serving as a part of the viewing path to the internal discharge section 14. In the above configuration, a user standing and confronting the front surface 12F in order to hold an IC card over the surface 41 over which a card is held can see a sheet discharged on the internal discharge tray 143 without moving his or her body and eyes after placing the IC card.

Figure 8:
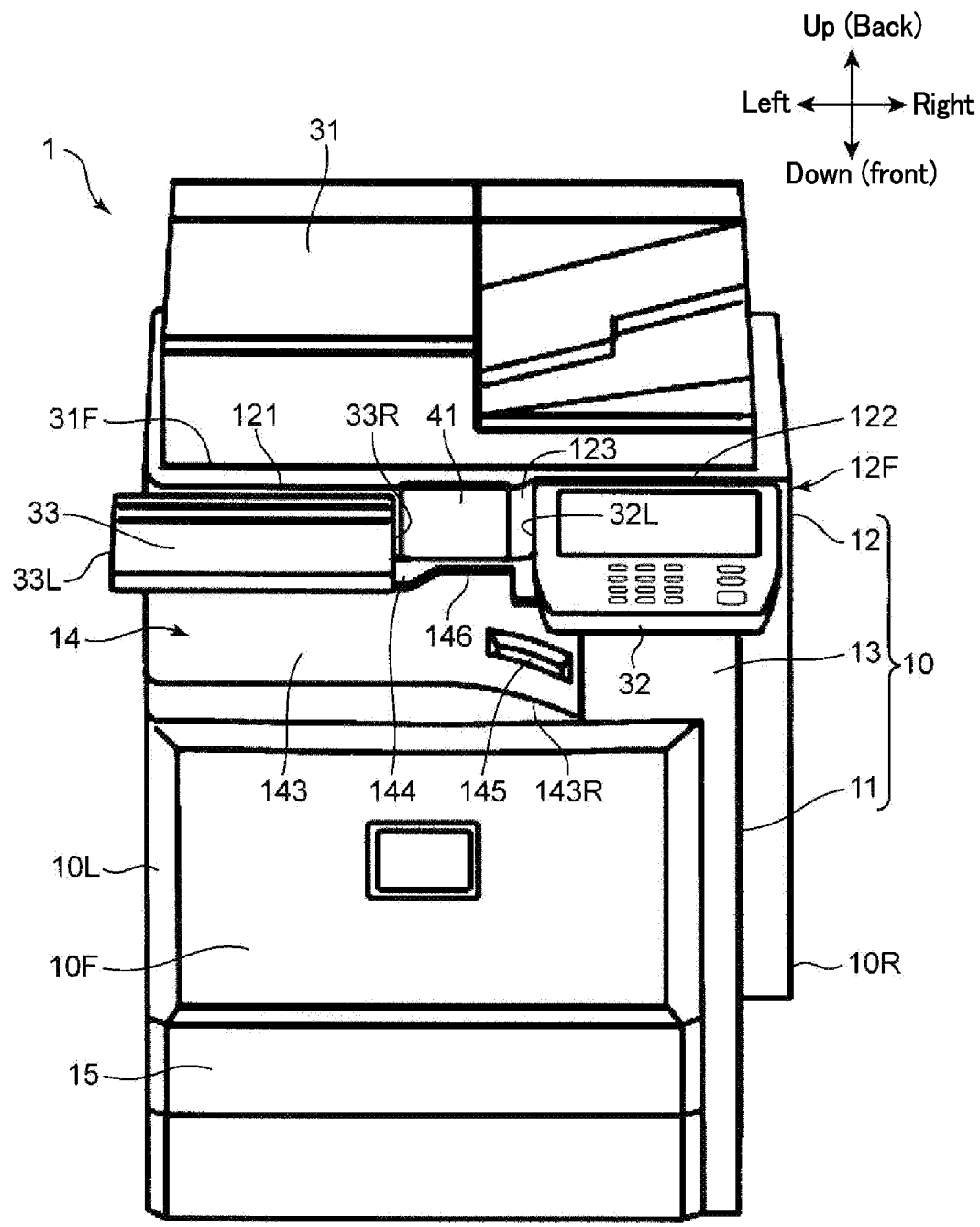
FIG. 8 is a perspective view of the image forming apparatus as viewed from the front according to the embodiment of the present invention.
Figure 9:
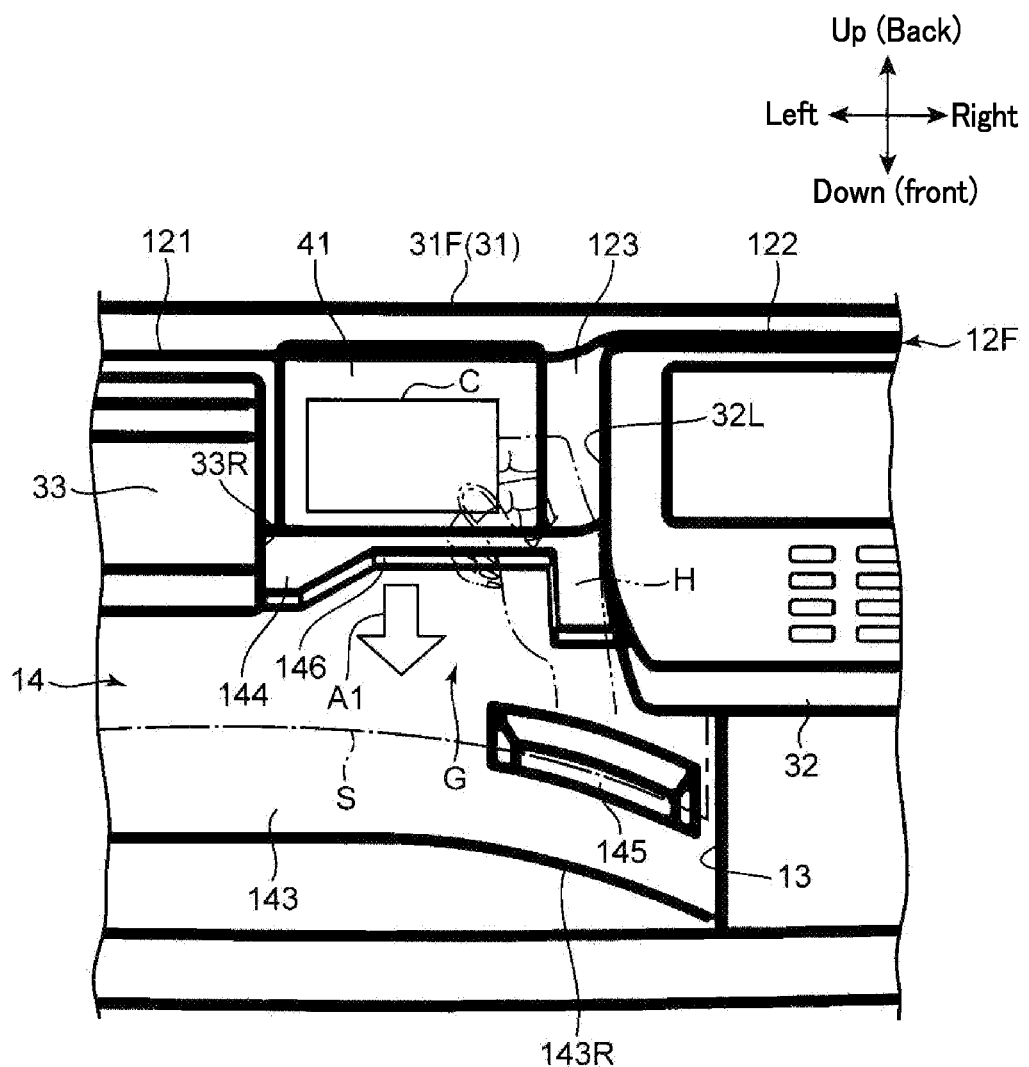
FIG. 9 is an enlarged diagram illustrating a state of a main part of the image forming apparatus in FIG. 8 when used by a user.

Still further, a sheet can be easily taken out from the internal discharge tray 143 in the present embodiment. Description about the ease of an operation of taking a sheet out will be made below with reference to FIGS. 8 and 9. FIG. 8 is a perspective view of the image forming apparatus 1 when viewed downward from the front. FIG. 9 is an enlarged diagram of a main portion of the image forming apparatus 1 in FIG. 8. FIG. 9 illustrates a state in which a user uses the image forming apparatus 1.

The surface 41 over which a card is held is located above the internal discharge section 14. Specifically, the surface 41 over which a card is held is disposed around the central part of the front surface 12F in the right and left directions and the internal discharge section 14 is located on the left side of the joint housing 13. The surface 41 over which a card is held is accordingly disposed above a part of the internal discharge section 14 that is located slightly right from the center thereof.

The part located slightly right from the center of the internal discharge section 14 is located in a region close to the first sheet exit port 141 (see FIG. 2). In this region, the internal discharge tray 143 has a right downward sloping portion 143R. In the above configuration, tail edges of sheets S successively discharged through the first sheet exit port 141 are aligned due to the presence of the inclined portion 143R. As a result, the sheets S of which tail edges are aligned are stacked on the internal discharge tray 143. In other words, the discharged sheets S (or a stack of the sheets S) are present at a location immediately below the surface 41 over which a card is held. Note that among two opposite edges of a sheet S that are perpendicular to a sheet discharge direction, the term tail edge refers to whichever of the edges is discharged later.

A recess 145 is present in a region (the inclined portion 143R) of the internal discharge tray 143 that is located below the surface 41 over which a card is held. A user can insert a finger into the recess 145 in order to take out a sheet S on the internal discharge tray 143. The recess 145 is a hollow having a rectangular opening when viewed from above. Further, a notch 146 is present in a region of the sub-exit tray 144 that is located below the surface 41 over which a card is held (see FIG. 6 also). The notch 146 allows a user's hand to pass therethrough in the vertical direction.

In the above configuration, a user can efficiently perform an operation of placing an IC card and an operation of taking out a sheet S from the internal discharge tray 143 as a continuous series of operations.

Assume that the image forming apparatus 1 is used as a printer. A user first brings through the gap G, a hand H holding an IC card C close to the surface 41 over which a card is held and holds the IC card C over the surface 41 over which a card is held, as illustrated in FIG. 9. When image formation is then performed and a sheet S is discharged onto the internal discharge tray 143, the user directly brings the hand H down through the notch 146 as indicated by an arrow A1. In this manner, the user can access the internal discharge tray 143. The user can take out the sheet S from the internal discharge tray 143 by inserting a finger into the recess 145 in the internal discharge tray 143 and catching a side edge part of the sheet S. Further, in a situation in which a sheet S is discharged onto the sub-exit tray 144, the sheet S can be taken out through the notch 146.

That is, the user can take out a sheet S simply by directly bringing down the hand H after holding the IC card C over the surface 41 over which a card is held. In other words, operation from placing the IC card C to taking out the sheet S can be achieved by minimal user movement. This is significantly advantageous for a user in a wheelchair, for example. For example, in a configuration in which the surface over which a card is held is disposed on the right or left side surface 10R or 10L of the image forming apparatus 1, a user in a wheelchair is required to move first to a location where a hand reaches a surface over which a card is held, hold an IC card over the surface over which a card is held, move to the front of the internal discharge tray 143, and take out a sheet S. By contrast, in the image forming apparatus 1 according to the present embodiment, such operation, which is burdensome for a user in a wheelchair, can be avoided.

Figure 10:
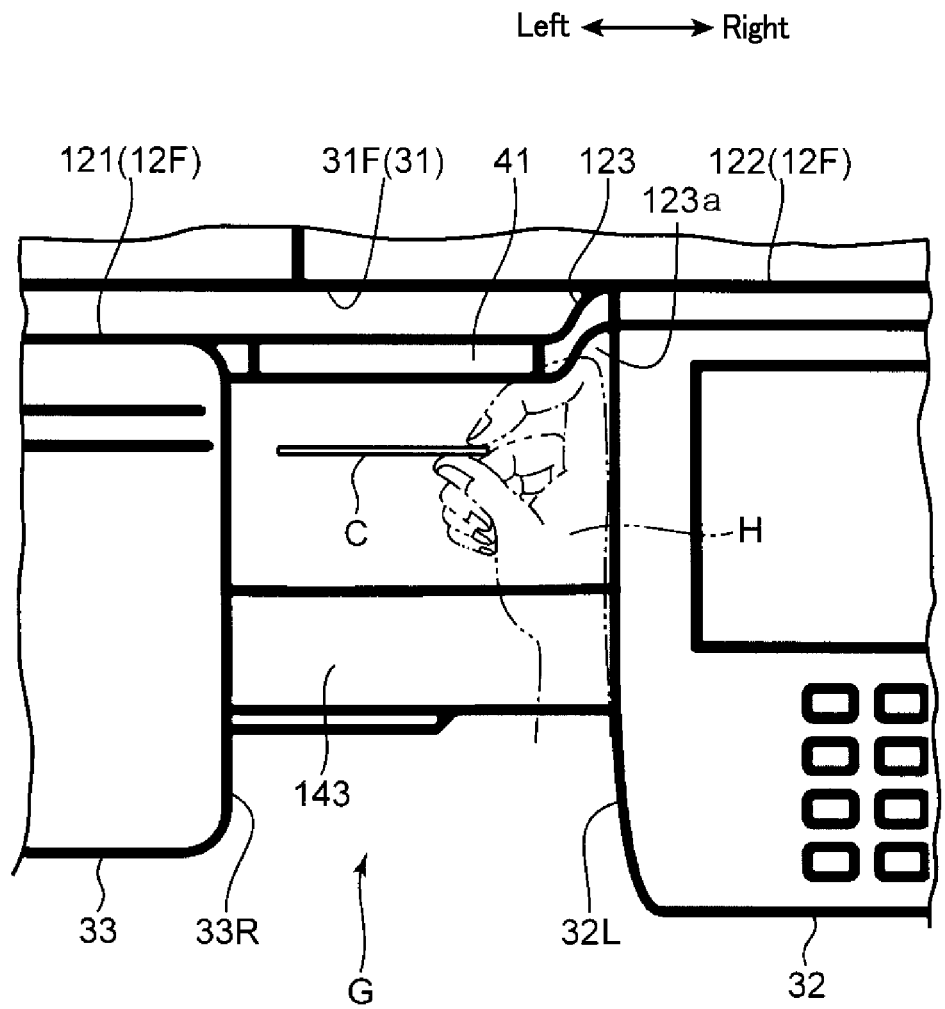
FIG. 10 is an enlarged diagram illustrating a state of a main part of the image forming apparatus in FIG. 5 when used by a user.

Further, in the present embodiment, a user can easily hold an IC card over the surface 41 over which a card is held. FIG. 10 is an enlarged diagram of a main portion of the image forming apparatus 1 in FIG. 5. FIG. 10 illustrates a state in which a user performs card placing operation using an IC card. Note that the sub-exit tray 144 is not illustrated in FIG. 10. An indentation 123a indented rearward is present at the right side (a side part) of the surface 41 over which a card is held in the front surface 12F of the scanner housing 12.

The front surface 12F has the left portion 121 and the right portion 122 set in from the left portion 121. The surface 41 over which a card is held is aligned with the left portion 121 in the right region of the left portion 121. On the other hand, the operation section 32 protrudes frontward from the right portion 122. The intermediate portion 123 connecting the left and right portions 121 and 122 is accordingly located between the right edge of the surface 41 over which a card is held and the left side surface 32L of the operation section 32 and has the indentation 123a when the surface 41 over which a card is held is viewed as a reference.

When the user brings the hand H (right hand) holding the IC card C close to the surface 41 over which a card is held, the indentation 123a can receive a part of a finger. FIG. 10 illustrates a state in which the forefinger is inserted in the indentation 123a. The user accordingly can bring the IC card C close to the surface 41 over which a card is held free of significant restriction by the front surface 12F of the scanner housing 12 on finger motion. In general, an operation section tends to hinder the card placing operation. However, in the present embodiment in which the indentation 123a is present between the surface 41 over which a card is held and the operation section 32, the user can smoothly perform the card placing operation.

Note that the auto document feeder 31 is disposed on the top of the scanner housing 12 in the present embodiment. The auto document feeder 31 has a front surface 31F (a confronting surface) that a user confronts. As illustrated in FIGS. 5 and 10, the auto document feeder 31 is mounted on the top of the scanner housing 12 such that the front surface 31F is set back from the surface 41 over which a card is held.

The front surface 31F of the auto document feeder 31 is set back from the right portion 122 of the front surface 12F of the scanner housing 12. That is, the auto document feeder 31 is mounted on the top of the scanner housing 12 such that the front surface 31F is set back from the indentation 123a.

Specifically, the auto document feeder 31 is mounted on the top of the scanner housing 12 such that the front surface 31F is at a location set back from a part of the indentation 123a that is set in the most. In the above configuration, the auto document feeder 31 does not hinder a user from performing the card placing operation.

As has been described with reference to FIGS. 1-11, the card reader 42 is embedded behind the front surface 12F of the scanner housing 12 in the present embodiment. The surface 41 over which a card is held is located in the front surface 12F of the scanner housing 12. The information reading surface 421 of the card reader 42 is located behind the surface 41 over which a card is held.

In the above configuration, the card reader 42 protrudes neither from the body housing 11 nor the scanner housing 12 of the image forming apparatus 1. As a result, workload of packing and transporting the image forming apparatus 1 can be reduced and damage (e.g., breakage of the card reader 42) and cost (e.g., transportation cost for the image forming apparatus 1) can be reduced. Further, efficiency in operations such as transportation and packing of the image forming apparatus 1 can be increased, thereby enabling reduction in cost.

Moreover, even in a configuration in which a vertical length of the scanner housing 12 is shorter than that of the information reading surface 421, in the present embodiment, the card reader 42 can be embedded behind the front surface 12F of the scanner housing 12 by inclining the information reading surface 421. Front downward sloping of the information reading surface 421 and the surface 41 over which a card is held can enable a user confronting the front surface 12F of the scanner housing 12 to easily view the surface 41 over which a card is held and to easily holds the IC card C thereover.

Still further, in the present embodiment, once the user holds the IC card C over the surface 41 over which a card is held and a sheet S is discharged into the internal discharge section 14, the user can take out the sheet S simply by directly bringing down the hand. That is, operation from placing the IC card C to taking out the sheet S can be achieved by minimum user movement. This is significantly advantageous for a user in a wheelchair, for example.

Still more, the operation section 32 and the table 33 mounted as above can increase user friendliness of the image forming apparatus 1. In general, the operation section and the table mounted on the front surface of the scanner housing are liable to block user's eyes to the internal discharge section, thereby impairing visibility of an discharged sheet. However, the surface 41 over which a card is held is located between the operation section 32 and the table 33 in present embodiment, which can secure a viewing path to the internal discharge section 14. Thus, visibility of an discharged sheet S can be maintained favorably.

Furthermore, in the present embodiment, once the user holds the IC card C over the surface 41 over which a card is held and a sheet S is discharged into the internal discharge section 14, the user can take out the sheet S only by directly bringing down the hand and inserting a finger into the recess 145.

Further, in the present embodiment, after holding the IC card C over the surface 41 over which a card is held, the user can access the internal discharge tray 143 through the notch 146 by directly bringing down the hand. Yet further, in a situation in which a sheet S is discharged onto the sub-exit tray 144, the user can easily take out the sheet S through the notch 146.

Still further, in the present embodiment, a part of the table 33 can be withdrawn for evacuation so as not to protrude from the side surface of the scanner housing 12 by utilizing space in front of the surface 41 over which a card is held.

Moreover, in the present embodiment, when the user brings fingers close to the surface 41 over which a card is held while holding the IC card C, the indentation 123a can receive a finger. The user accordingly can bring the IC card C close to the surface 41 over which a card is held free of significant restriction by the front surface 12F of the scanner housing 12 on finger motion.

Moreover, in the configuration according to the present embodiment in which the indentation 123a is present between the surface 41 over which a card is held and the operation section 32, a user can smoothly perform the card placing operation. Note that the operation section generally may tend to hinder a user from performing the card placing operation.

In addition, in the configuration according to present embodiment in which the auto document feeder 31 is disposed at a location set back from the surface 41 over which a card is held or the indentation 123a, the auto document feeder 31 mounted on the top of the scanner housing 12 does not hinder a user from performing the card placing operation.

A certain embodiment of the present invention has been described so far, which however should not be taken to limit the present invention. For example, the following alternative embodiments can be adopted.

Figure 11:
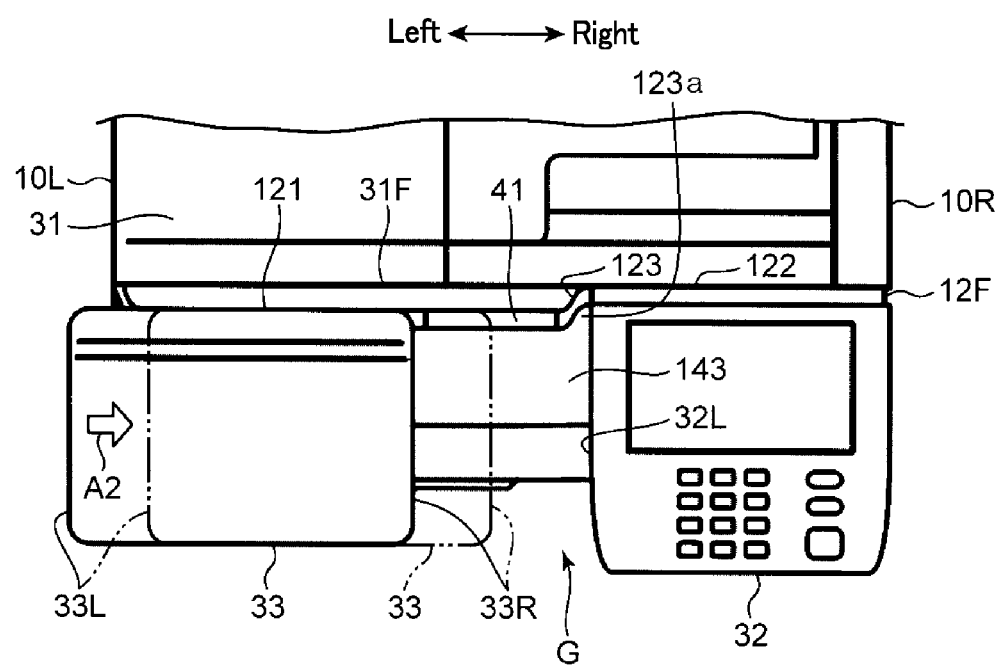
FIG. 11 is a top view of an image forming apparatus according to an alternative embodiment of the present invention.

(1) The gap G between the operation section 32 and the table 33, that is, a space for the surface 41 over which a card is held may be used as a space for evacuation of the table 33. FIG. 11 is a top view of the image forming apparatus 1 according to an alternative embodiment. In the present alternative embodiment, the table 33 is movable in a horizontal direction. Specifically, the table 33 is mounted on the front surface 12F of the scanner housing 12 movably in the right and left directions. The width of the table 33 in the right and left directions is greater than the width of the left region of the left portion 121 of the front surface 12F (a region of the left portion 121 exclusive of the surface 41 over which a card is held).

The table 33 is changeable in position between a first position and a second position. The table 33 is usually positioned at the first position. The scanner housing 12 has a left side surface 8 (a side surface) perpendicular to the front surface 12F. The first position is a position of the table 33 in which a left portion (one end portion) of the table 33 protrudes outward from the left side surface of the scanner housing 12 (the left side surface 10L of the main body 10). The left portion of the table 33 includes a left side surface 33L of the table 33. When the table 33 is positioned at the first position, a right portion (another end portion) of the table 33 does not face the surface 41 over which a card is held. The right portion of the table 33 includes a right side surface 33R of the table 33.

By contrast, in transportation or the like of the image forming apparatus 1, the table 33 is moved rightward as indicated by an arrow A2 to be positioned at the second position indicated by a chain line in the drawing. The second position is a position of the table 33 in which the left portion of the table 33 does not protrude outward from the left side surface of the scanner housing 12 while the right portion of the table 33 faces the surface 41 over which a card is held. When the table is positioned at the second position, the left side surface 33L does not protrude from the left side surface of the scanner housing 12 (the left side surface 10L of the main body 10). In the above configuration, the left portion of the table 33 can be evacuated so as not to protrude from the left side surface of the scanner housing 12 (the left side surface 10L of the main body 10) by utilizing a space for the surface 41 over which a card is held. This can be advantageous in transportation and packing of the image forming apparatus 1.

(2) The above embodiment presents an example in which the card reader 42 is embedded behind the front surface 12F of the scanner housing 12 with an inclination by the predetermined angle θ relative to the vertical line V. However, in a configuration in which the scanner housing 12 has a sufficient thickness in the vertical direction, the card reader 42 may be embedded without inclination. Further, the card reader 42 and the surface 41 over which a card is held may be embedded in the front surface 12F of the scanner housing 12 in a rotatable manner so that the angle of the surface 41 over which a card is held is variable.

(3) In a configuration in which the operation section 32 and/or the table 33 is/are absent from the front surface 12F of the scanner housing 12, the card reader 42 and the surface 41 over which a card is held may be disposed at any location in the front surface 12F.

INDUSTRIAL APPLICABILITY

The present invention can be utilized in the field of image forming apparatuses and scanners that include a contactless card reader.

The invention claimed is:

1. An image forming apparatus comprising:
a scanner unit configured to optically read an image of an original document to generate image data;
an image forming unit configured to form an image on a sheet based on the image data;
a body housing that accommodates the image forming unit;
a scanner housing that is disposed above the body housing and that accommodates the scanner unit;
a contactless card reader having a flat information reading surface and configured to read information recorded on an information card;
an internal discharge section that is disposed between the body housing and the scanner housing and into which the sheet on which the image is formed by the image forming unit is discharged; and
a pillar disposed between the body housing and the scanner housing, wherein
the scanner housing has a confronting surface that a user confronts,
the card reader is mounted inside the scanner housing such that the information reading surface takes an upstanding posture, and is disposed behind the confronting surface of the scanner housing,
the confronting surface of the scanner housing includes a surface that covers the information reading surface and over which a card is held,
the pillar is disposed at a side of the internal discharge section and has a sheet exit port through which the sheet is discharged into the internal discharge section,
the surface over which a card is held is located above the internal discharge section,
the sheet exit port includes: a first sheet exit port; and a second sheet exit port located above the first sheet exit port, the internal discharge section includes:
a first sheet tray disposed below the first sheet exit port and configured to receive a sheet discharged through the first sheet exit port; and
a second sheet tray disposed between the first sheet exit port and the second sheet exit port and configured to receive a sheet discharged through the second sheet exit port, and
the second sheet tray has a notch present in a region of the second sheet tray that is located below the surface over which a card is held.

2. The image forming apparatus according to claim 1, wherein
the card reader is mounted inside the scanner housing such that the information reading surface is inclined by a predetermined angle relative to a vertical line, and
the surface over which a card is held is inclined in correspondence with inclination of the information reading surface.

3. An image forming apparatus according to claim 2, wherein
the predetermined angle is equal to or greater than 5 degrees and not greater than 10 degrees.

4. The image forming apparatus according to claim 1, further comprising:
an operation section protruding from the confronting surface of the scanner housing and configured to receive user input of operation information; and
a table protruding from the confronting surface of the scanner housing, wherein
the surface over which a card is held is disposed between the operation section and the table.

5. The image forming apparatus according to claim 4, wherein
the scanner housing has a side surface perpendicular to the confronting surface,
the table is movable in a horizontal direction and is changeable in position between a first position and a second position,
the first position is a position of the table in which one end portion of the table protrudes outward from the side surface of the scanner housing, and
the second position is a position of the table in which the one end portion of the table does not protrude outward from the side surface of the scanner housing while another end portion of the table faces the surface over which a card is held.

6. The image forming apparatus according to claim 1, wherein
the internal discharge section includes a sheet tray disposed below the sheet exit port,
the sheet tray receives the sheet discharged through the sheet exit port, and
the sheet tray has a recess present in a region of the sheet tray that is located below the surface over which a card is held.

7. The image forming apparatus according to claim 1, wherein
the confronting surface of the scanner housing has an indentation indented rearward at a side of the surface over which a card is held.

8. The image forming apparatus according to claim 7, further comprising
an operation section protruding from the confronting surface of the scanner housing and configured to receive user input of operation information, wherein
the indentation is present between the surface over which a card is held and the operation section.

9. The image forming apparatus according to claim 7, further comprising
an auto document feeder configured to automatically convey the original document via a document reading point of the scanner unit, wherein
the auto document feeder has a confronting surface that the user confronts, and
the auto document feeder is mounted on a top of the scanner housing such that the confronting surface of the auto document feeder is set back from the indentation.

10. The image forming apparatus according to claim 1, further comprising
an auto document feeder configured to automatically convey the original document via a document reading point of the scanner unit, wherein
the auto document feeder has a confronting surface that the user confronts, and
the auto document feeder is mounted on a top of the scanner housing such that the confronting surface of the auto document feeder is set back from the surface over which a card is held.

11. An image forming apparatus comprising:
a scanner unit configured to optically read an image of an original document to generate image data;
an image forming unit configured to form an image on a sheet based on the image data;
a body housing that accommodates the image forming unit;
a scanner housing that is disposed above the body housing and that accommodates the scanner unit, the scanner housing having a confronting surface that a user confronts;
a contactless card reader having a flat information reading surface and configured to read information recorded on an information card;
an internal discharge section that is disposed between the body housing and the scanner housing and into which the sheet on which the image is formed by the image forming unit is discharged;
a pillar disposed between the body housing and the scanner housing;
an operation section protruding from the confronting surface of the scanner housing and configured to receive user input of operation information; and
a table protruding from the confronting surface of the scanner housing, wherein
the card reader is mounted inside the scanner housing such that the information reading surface takes an upstanding posture, and is disposed behind the confronting surface of the scanner housing,
the confronting surface of the scanner housing includes a surface that covers the information reading surface and over which a card is held,
the pillar is disposed at a side of the internal discharge section and has a sheet exit port through which the sheet is discharged into the internal discharge section,
the surface over which a card is held is located above the internal discharge section and between the operation section and the table,
the scanner housing has a side surface perpendicular to the confronting surface,
the table is movable in a horizontal direction and is changeable in position between a first position and a second position,
the first position is a position of the table in which one end portion of the table protrudes outward from the side surface of the scanner housing, and
the second position is a position of the table in which the one end portion of the table does not protrude outward from the side surface of the scanner housing while another end portion of the table faces the surface over which a card is held.

12. An image forming apparatus comprising:
a scanner unit configured to optically read an image of an original document to generate image data;
an image forming unit configured to form an image on a sheet based on the image data;
a body housing that accommodates the image forming unit;
a scanner housing that is disposed above the body housing and that accommodates the scanner unit, the scanner housing having a confronting surface that a user confronts;
a contactless card reader having a flat information reading surface and configured to read information recorded on an information card; and
an operation section protruding from the confronting surface of the scanner housing and configured to receive user input of operation information, wherein
the card reader is mounted inside the scanner housing such that the information reading surface takes an upstanding posture, and is disposed behind the confronting surface of the scanner housing,
the confronting surface of the scanner housing includes a surface that covers the information reading surface and over which a card is held,
the confronting surface of the scanner housing has an indentation indented rearward at a side of the surface over which a card is held, and
the indentation is present between the surface over which a card is held and the operation section.

* * * * *